United States Patent
Boyd et al.

(10) Patent No.: US 8,554,082 B2
(45) Date of Patent: Oct. 8, 2013

(54) ETHERNET PASSIVE OPTICAL NETWORK OVER COAXIAL (EPOC)

(75) Inventors: Edward Wayne Boyd, Petaluma, CA (US); Sanjay Goswami, Santa Rosa, CA (US)

(73) Assignee: Broadcom Corporation, Irvine, CA (US)

( * ) Notice: Subject to any disclaimer, the term of this patent is extended or adjusted under 35 U.S.C. 154(b) by 366 days.

(21) Appl. No.: 12/878,643

(22) Filed: Sep. 9, 2010

(65) Prior Publication Data

US 2011/0058813 A1    Mar. 10, 2011

Related U.S. Application Data

(60) Provisional application No. 61/240,935, filed on Sep. 9, 2009, provisional application No. 61/306,745, filed on Feb. 22, 2010.

(51) Int. Cl.
*H04B 10/00* (2013.01)

(52) U.S. Cl.
USPC .......................................... 398/116; 398/66

(58) Field of Classification Search
USPC .................... 398/66–67, 115–117
See application file for complete search history.

(56) References Cited

U.S. PATENT DOCUMENTS

| | | | |
|---|---|---|---|
| 8,289,858 B2 * | 10/2012 | Brolin et al. | 370/249 |
| 2003/0194241 A1 | 10/2003 | Farmer | |
| 2009/0060531 A1 * | 3/2009 | Biegert et al. | 398/214 |

FOREIGN PATENT DOCUMENTS

WO    WO 2008/100003 A1    8/2008

OTHER PUBLICATIONS

Preliminary Report on Patentability for PCT/US2010/048232, Mar. 22, 2012, 6 pages.
Moeyart, V., et al.: "Physical Layer Characterization of Hybrid Fibre Coax (HFC) Networks," *Annales Des Telecommunications* 54(May 2006):259-266, Get Lavoisier, Paris, France, (May 1999), XP000849492, ISSN: 0003-4347.
International Search Report with Written Opinion of the International Searching Authority for International Patent Application No. PCT/US2010/048232, issued Jan. 13, 2011.

\* cited by examiner

*Primary Examiner* — Leslie Pascal
(74) *Attorney, Agent, or Firm* — Sterne, Kessler, Goldstein & Fox P.L.L.C.

(57) ABSTRACT

Embodiments of the present invention exploit the existing capabilities of the Ethernet Passive Optical Network (EPON) MAC layer, designed for fiber optics communications, to provide a low cost MAC layer with upper layer connectivity over a hybrid fiber coaxial (HFC) network. In particular, embodiments allow for the EPON MAC to be used end-to-end (i.e., from an optical line terminal (OLT) to a coaxial network unit (CNU)) in a HFC network, thereby fully leveraging the packet processing capabilities, QoS functions, and management features of the EPON MAC. Furthermore, embodiments enable unified provisioning and management for both fiber and coaxial network units in a HFC network.

31 Claims, 9 Drawing Sheets

ETHERNET PASSIVE OPTICAL NETWORK OVER COAXIAL (EPOC)

CROSS-REFERENCE TO RELATED APPLICATIONS

The present application claims the benefit of U.S. Provisional Patent Application No. 61/240,935 filed on Sep. 9, 2009 and U.S. Provisional Patent Application No. 61/306,745 filed on Feb. 22, 2010, both of which are incorporated herein by reference in their entireties.

BACKGROUND

1. Field of the Invention

The present invention relates generally to Ethernet.

2. Background Art

A Passive Optical Network (PON) is a single, shared optical fiber that uses inexpensive optical splitters to divide a single fiber into separate strands feeding individual subscribers. An Ethernet PON (EPON) is a PON based on the Ethernet standard. EPONs provide simple, easy-to-manage connectivity to Ethernet-based, IP equipment, both at customer premises and at the central office. As with other Gigabit Ethernet media, EPONs are well-suited to carry packetized traffic.

Existing EPON Optical Line Terminals (OLT) implement an EPON MAC layer (IEEE 802.3ah). The EPON MAC layer provides various packet processing capabilities, quality of service (QoS) functions, and management features. Today, however, these capabilities, functions, and features can only be exploited over pure optical fiber networks.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. Generally, the drawing in which an element first appears is typically indicated by the leftmost digit(s) in the corresponding reference number.

DETAILED DESCRIPTION OF EMBODIMENTS

Embodiments of the present invention exploit the existing capabilities of the Ethernet Passive Optical Network (EPON) MAC layer, designed for fiber optics communications, to provide a low cost MAC layer with upper layer connectivity over a hybrid fiber coaxial (HFC) network. In particular, embodiments allow for the EPON MAC to be used end-to-end (i.e., from an optical line terminal (OLT) to a coaxial network unit (CNU)) in a HFC network, thereby fully leveraging the packet processing capabilities, QoS functions, and management features of the EPON MAC. Furthermore, embodiments enable unified provisioning and management for both fiber and coaxial network units in a HFC network. In the following, exemplary embodiments of the present invention will be provided for the purpose of illustration. However, embodiments are not limited to the examples provided, but extend to any variations and/or improvements that would be readily apparent to a person of skill in the art based on the teachings herein.

Figure 1:
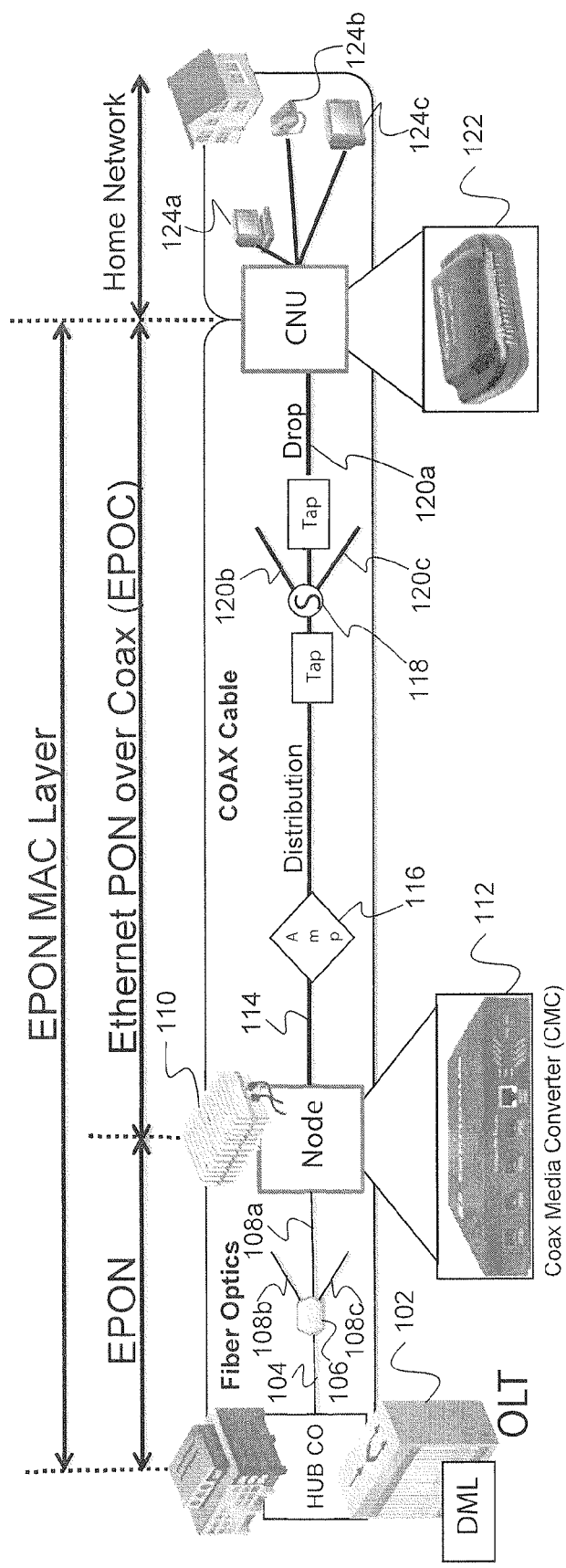
FIG. 1 illustrates an example hybrid Ethernet Passive Optical Network (EPON)-Ethernet Passive Optical Network Over Coax (EPOC) network architecture according to an embodiment of the present invention.

FIG. 1 illustrates an example hybrid Ethernet Passive Optical Network (EPON)-Ethernet Passive Optical Network Over Coax (EPOC) network architecture 100 according to an embodiment of the present invention. As shown in FIG. 1, example network architecture 100 includes an Optical Line Terminal (OLT) 102, an optional optical passive splitter 106, a communications node 110 including a coaxial media converter (CMC), an optional amplifier 116, an optional coaxial splitter 118, a coaxial network unit (CNU) 122, and a plurality of subscriber media devices 124.

OLT 102 sits at a central office (CO) of the network and is coupled to a fiber optic line 104. OLT 102 may implement a DOCSIS (Data Over Cable Service Interface Specification) Mediation Layer (DML) which allows OLT 102 to provide DOCSIS provisioning and management of network components (e.g., CMC, CMU, Optical Network Unit (ONU)). Additionally, OLT 102 implements an EPON Media Access Control (MAC) layer (e.g., IEEE 802.3ah).

Optionally, passive splitter 106 can be used to split fiber optic line 104 into a plurality of fiber optic lines 108. This allows multiple subscribers in different geographical areas to be served by the same OLT 102 in a point-to-multipoint topology.

Communications node 110 serves as a bridge between the EPON side and the EPOC side of the network. Accordingly, node 110 is coupled from the EPON side of the network to a fiber optic line 108a, and from the EPOC side of the network to a coaxial cable 114. In an embodiment, communications node 110 includes a coaxial media converter (CMC) 112 that allows EPON to EPOC (and vice versa) bridging and conversion.

CMC 112 performs physical layer (PHY) conversion from EPON to EPOC, and vice versa. In an embodiment, CMC 112 includes a first interface (not shown in FIG. 1), coupled to fiber optic line 108, configured to receive a first optical signal from OLT 102 and generate a first bitstream having a first physical layer (PHY) encoding. In an embodiment, the first PHY encoding is EPON PHY encoding. CMC 112 also includes a PHY conversion module (not shown in FIG. 1), coupled to the first interface, configured to perform PHY layer conversion of the first bitstream to generate a second bitstream having a second PHY encoding. In an embodiment, the second PHY encoding is EPOC PHY encoding. Furthermore, CMC 112 includes a second interface (not shown in FIG. 1), coupled to the PHY conversion module and to coaxial cable 114, configured to generate a first radio frequency (RF) signal from the second bitstream and to transmit the first RF signal over coaxial cable 114.

In EPOC to EPON conversion (i.e., in upstream communication), the second interface of CMC 112 is configured to receive a second RF signal from CNU 122 and generate a third bitstream therefrom having the second PHY encoding (e.g., EPOC PHY encoding). The PHY conversion module of CMC 112 is configured to perform PHY layer conversion of the third bitstream to generate a fourth bitstream having the first PHY encoding (e.g., EPON PHY encoding). Subsequently, the first interface of CMC 112 is configured to generate a second optical signal from the fourth bitstream and to transmit the second optical signal to OLT 102 over fiber optic line 108.

Optionally, an amplifier 116 and a second splitter 118 can be placed in the path between communications node 110 and CNU 122. Amplifier 116 amplifies the RF signal over coaxial cable 114 before splitting by second splitter 118. Second splitter 118 splits coaxial cable 114 into a plurality of coaxial cables 120, to allow service over coaxial cables of several subscribers which can be within same or different geographic vicinities.

CNU 122 generally sits at the subscriber end of the network. In an embodiment, CNU 122 implements an EPON MAC layer, and thus terminates an end-to-end EPON MAC link with OLT 102. Accordingly, CMC 112 enables end-to-end provisioning, management, and Quality of Service (QoS) functions between OLT 102 and CNU 122. CNU 122 also provides GigE (Gigabit Ethernet) and 100M Ethernet ports to connect subscriber media devices 124 to the network. Additionally, CNU 122 enables gateway integration for various services, including VoIP (Voice-Over-IP), MoCA (Multimedia over Coax Alliance), HPNA (Home Phoneline Networking Alliance), Wi-Fi (Wi-Fi Alliance), etc. At the physical layer, CNU 122 may perform physical layer conversion from coaxial to another medium, while retaining the EPON MAC layer.

According to embodiments, EPON-EPOC conversion can occur anywhere in the path between OLT 102 and CNU 122 to provide various service configurations according to the services needed or infrastructure available to the network. For example, CMC 112, instead of being integrated within node 110, can be integrated within OLT 102, within amplifier 116, or in an Optical Network Unit (ONU) located between OLT 102 and CNU 122 (not shown in FIG. 1).

Figure 2:
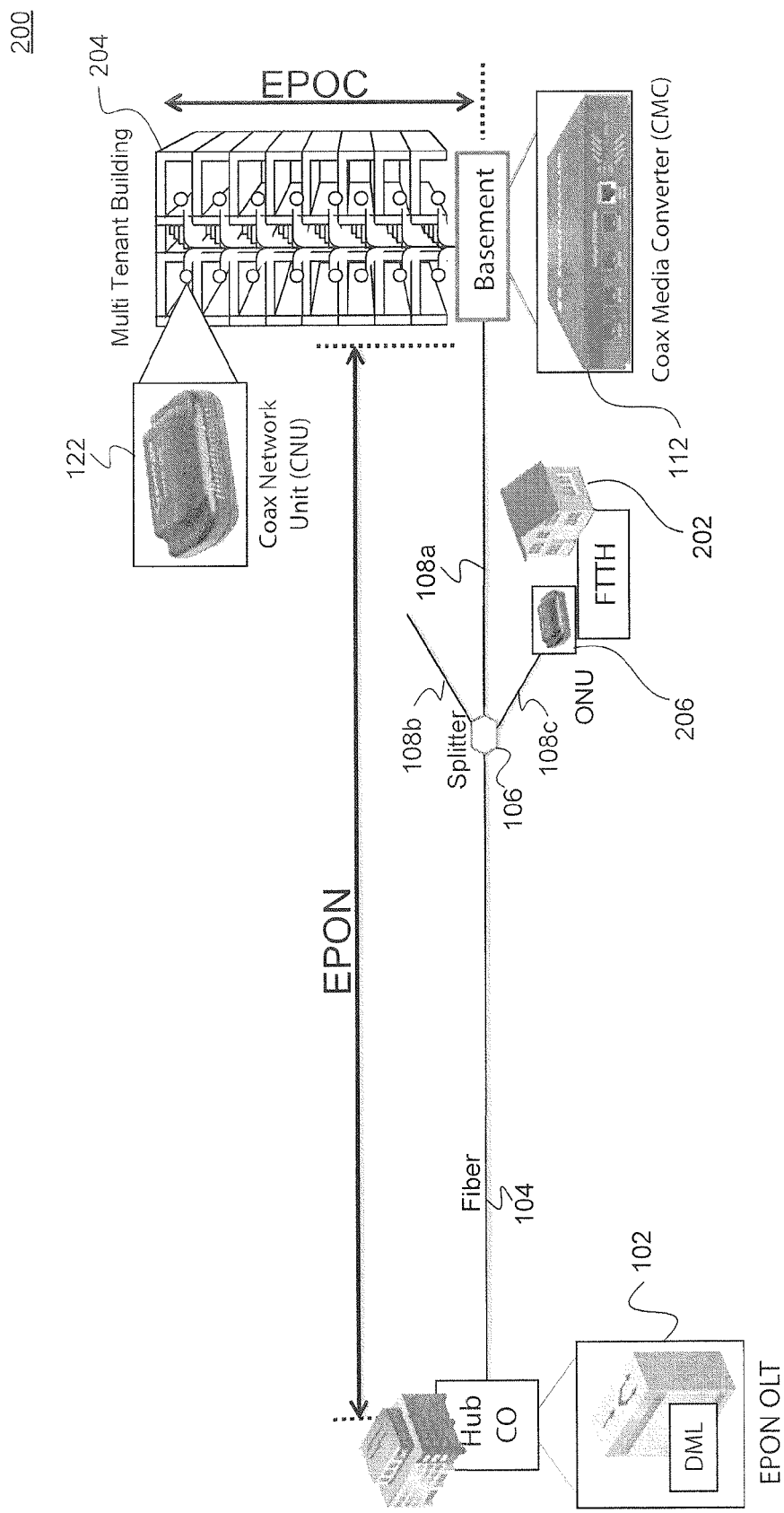
FIG. 2 illustrates another example hybrid EPON-EPOC network architecture for according to an embodiment of the present invention.

FIG. 2 illustrates another example hybrid EPON-EPOC network architecture 200 according to an embodiment of the present invention. In particular, example network architecture 200 enables simultaneous FTTH (Fiber to the Home) and multi-tenant building EPOC service configurations.

Example network architecture 200 includes similar components as described above with reference to example network architecture 100, including an OLT 102 located in a CO hub, a passive splitter 106, a CMC 112, and one or more CNUs 122. OLT 102, splitter 106, CMC 112, and CNU 122 operate in the same manner described above with reference to FIG. 1.

CMC 112 sits, for example, in the basement of a multi-tenant building 204. As such, the EPON side of the network extends as far as possible to the subscriber, with the EPOC side of the network only providing short coaxial connections between CMC 112 and CNU units 122 located in individual apartments of multi-tenant building 204.

Additionally, example network architecture 200 includes an Optical Network Unit (ONU) 206. ONU 206 is coupled to OLT 102 through an all-fiber link, comprised of fiber lines 104 and 108c. ONU 206 enables FTTH service to a home 202, allowing fiber optic line 108c to reach the boundary of the living space of home 202 (e.g., a box on the outside wall of home 202).

Accordingly, example network architecture 200 enables an operator to service both ONUs and CNUs using the same OLT. This includes end-to-end provisioning, management, and QoS with a single interface for both fiber and coaxial subscribers. In addition, example network architecture 200 allows for the elimination of the conventional two-tiered management architecture, which uses media cells at the end user side to manage the subscribers and an OLT to manage the media cells.

Figure 3:
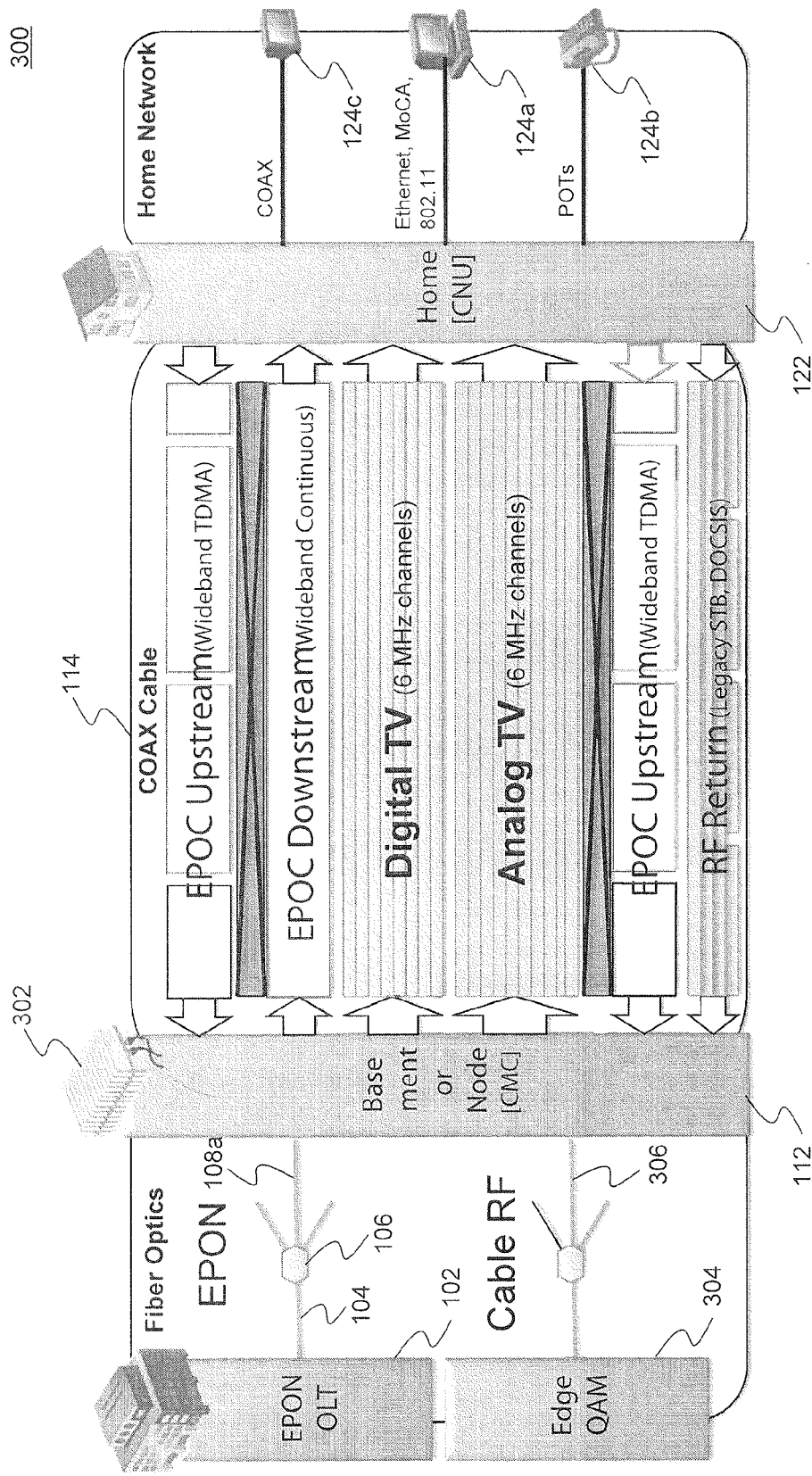
FIG. 3 illustrates another example hybrid EPON-EPOC network architecture according to an embodiment of the present invention.

FIG. 3 illustrates another example hybrid EPON-EPOC network architecture 300 according to an embodiment of the present invention.

Example network architecture 300 includes similar components as described above with reference to example architectures 100 and 200, including an OLT 102, a passive splitter 106, a CMC 112, a CNU 122, and a plurality of subscriber media devices 124. CMC 112 is integrated within a network node 302, which may be located in the basement of a multi-tenant building as described above with reference to FIG. 2 or in a mid-path communication node as described above with reference to FIG. 1, or some other configuration as will be understood by one skilled in the art. Additionally, example network architecture 300 includes an EDGE QAM modulator module 304, which may be located in the same or different location as OLT 102. EDGE QAM modulator 304 is coupled to network node 302 via a fiber optic line 306.

As such, network node 302 is being fed by two fiber optic lines 108a and 306, with fiber line 108a using digital optical signaling (containing EPON streams) and line 306 using analog RF signaling (containing cable RF data, including analog and digital TV streams and service information, for example). In an embodiment, network node 302 processes the incoming EPON and cable RF signals and bundles the processed incoming signals over coaxial cable 114 for transmission to CNU 122. For example, network node 302 converts the cable RF signal received over fiber line 306 from optical to electrical, and performs EPON-EPOC PHY layer conversion of the EPON signal received over fiber line 108a to an RF signal using CMC 112. Then, network node 302 combines and outputs the converted signals over coaxial cable 114. For example, as shown in FIG. 3, the EPON converted signals (EPOC downstream) are bundled together with Digital TV and Analog TV over coaxial cable 114. Additionally, the same coaxial cable 114 can be used to carry EPOC upstreams and RF return traffic (e.g., Legacy STB, DOCSIS, etc.) from CNU 122. It is noted that in an embodiment both EPON and cable RF signals can be carried over a single fiber line using DWDM (Dense Wavelength Division Multiplexing) from OLT 102 and EDGE QAM modulator module 304 to node 302.

Figure 4:
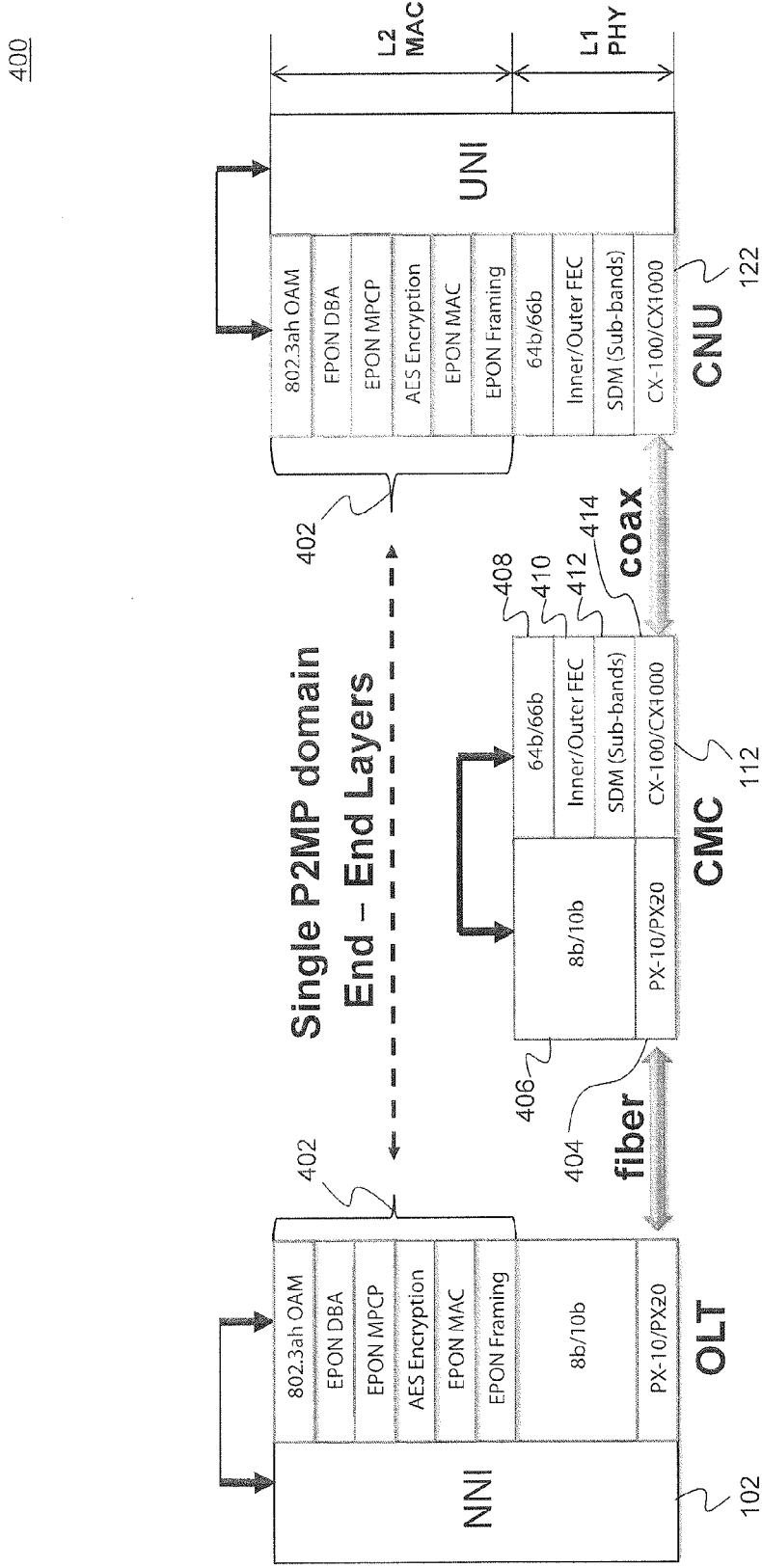
FIG. 4 illustrates an example end-to-end layered communication architecture between an Optical Line Terminal (OLT) and a Coaxial Network Unit (CNU) according to an embodiment of the present invention.

FIG. 4 is an example end-to-end layered communication architecture 400 between an Optical Line Terminal (OLT) and a Coaxial Network Unit (CNU) according to an embodiment of the present invention.

Example architecture 400 allows two-way EPON-EPOC communication between OLT 102 and CNU 122, via CMC 112. Further, example architecture 400 enables the EPON MAC to be used end-to-end (i.e., from OLT 102 to CNU 122), thereby leveraging the packet processing capabilities, QoS functions, and management features of the EPON MAC over a hybrid fiber coaxial (HFC) network.

As shown in FIG. 4, both OLT 102 and CNU 122 implement the same Layer 2 (L2) functions 402, including the EPON MAC layer. However, because OLT 102 and CNU 122 connect to different physical mediums (i.e., fiber versus coaxial), OLT 102 and CNU 122 implement different physical layers (PHY) (Layer 1).

CMC 112 sits between OLT 102 and CNU 122 and performs conversion at the PHY level only between the OLT 102 and CNU 122, and vice versa. In particular, CMC 112 converts a first bitstream having PHY encoding of OLT 102 (e.g., EPON PHY encoding) into a second bitstream with PHY encoding of CNU 122 (e.g., EPOC PHY encoding), and vice versa. Accordingly, the conversion at CMC 112 does not affect or change any framing in the received bitstream due to Layer 2 and above, including any framing due to the EPON MAC layer implemented at OLT 102 or CNU 122. In other words, data packets contained in the first bitstream and in the second bitstream have same MAC layer. In an embodiment, the MAC layer is of an EPON MAC layer (e.g., IEEE 802.3ah MAC layer).

In an embodiment, CMC 112 includes two physical layers (PHY) that implement first and second PHY stacks respectively, with the first PHY stack configured to communicate raw bits over a fiber optic line and the second PHY stack configured to communicate raw bits over a coaxial cable. Generally, the first PHY stack matches the PHY stack used by OLT 102, and the second PHY stack matches the PHY stack used by CNU 122. In an embodiment, the first PHY stack is configured as an EPON PHY stack and the second PHY stack is configured as a coaxial PHY stack. Additionally, CMC 112 includes a two-way conversion module that conditions an incoming bitstream received by the first PHY stack for transmission over the second PHY stack, and vice versa.

In an embodiment, as shown in FIG. 4, the first PHY stack includes two sublayers 404 and 406. Sublayer 404 performs power-related transmission functions over the fiber optic line, including determining and setting the transmission power levels. Sublayer 406 performs line encoding functions, including determining the line encoding rate of an incoming bitstream received by the first PHY, stripping the line encoding of the incoming bitstream, and adding line encoding to an outgoing bitstream from the first PHY. In an embodiment, the first PHY uses 8 b/10 b line encoding.

The second PHY stack includes sublayers 408, 410, 412, and 414. Sublayer 408 performs line encoding and packet framing functions, including determining the line encoding rate of an incoming bitstream received by the second PHY, stripping the line encoding of the incoming bitstream, and adding line encoding to an outgoing bitstream from the second PHY. In an embodiment, the second PHY uses 64 b/66 b line encoding. Additionally, sublayer 408 may perform framing functions, including adding framing bits to an outgoing bitstream from the second PHY and removing the framing bits of an incoming bitstream received by the second PHY. The framing bits determine the start and end of packets in a bitstream.

Sublayer 410 performs Forward Error Correction (FEC) functions, including adding inner and/or outer FEC bits to an outgoing bitstream from the second PHY, FEC correcting, and stripping the FEC bits of an incoming bitstream received by the second PHY.

Sublayer 412 performs Sub-Band Division Multiplexing functions, including determining the sub-bands to transmit an outgoing bitstream from the second PHY, dividing the outgoing bitstream into multiple sub-bands (as further described below with respect to FIG. 5), determining the width of the sub-bands, and assembling a bitstream received by the second PHY over multiple sub-bands to generate an incoming bitstream. According to embodiments, sublayer 412 may implement any one of Sub-Band Division Multiplexing (SDM), wavelet Orthogonal Frequency Division Multiplexing (OFDM), and Discrete Wavelet Multitone (DWMT), for example.

Sublayer 414 performs power-related transmission functions over coaxial cable. Sublayer 414 can be a proprietary sublayer or other sublayer adopted by a standards body.

The first PHY and the second PHY of CMC 112 for in together with optionally other modules of CMC 112 (e.g., linking or interface modules between the first and second PHY) a two-way conversion module that conditions an incoming bitstream received by the first PHY for transmission by the second PHY, and vice versa. In an embodiment, an incoming bitstream received by the first PHY over a fiber optic line is processed by sublayers 404 and 406 of the first PHY stack to generate an intermediate bitstream. The intermediate bitstream then is processed consecutively by sublayers 408, 414, 412, and 414 of the second PHY stack to generate an outgoing bitstream for transmission by the second PHY over a coaxial cable. In a similar manner, an incoming bitstream received by the second PHY over the coaxial cable can be conditioned for transmission by the first PHY over the fiber optic line.

As would be understood by a person of skill in the art, example architecture 400, described above, is provided for the purpose of illustration only, and is not limiting of embodiments of the present invention. For example, in other embodiments, different Layer 1 (PHY) and Layer 2 (MAC) stacks and sublayers may be used to perform the media conversion functionality described above.

Figure 5:
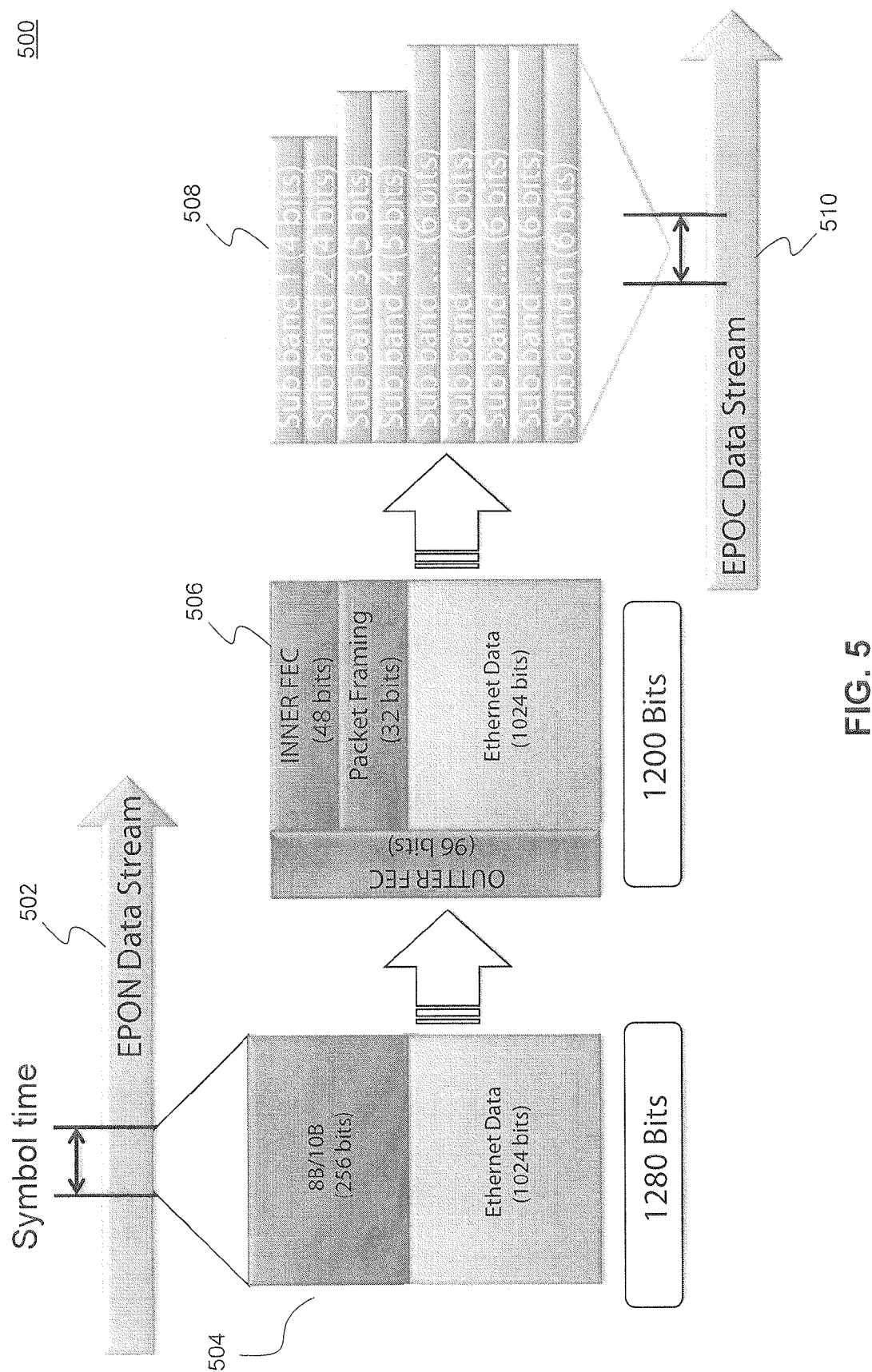
FIG. 5 illustrates an example EPON to EPOC conversion according to an embodiment of the present invention.

FIG. 5 illustrates an example EPON to EPOC conversion according to an embodiment of the present invention. In particular, FIG. 5 illustrates an example process 500 for converting an EPON data stream 502 into an EPOC data stream 510. Example process 500 operates on a sub-stream 504 of EPON data stream 502 to generate a corresponding sub-stream 508 of EPOC data stream 510. Sub-stream 504 corresponds to one symbol time worth of EPON data stream 502 and has symbol time duration (e.g., 1 microsecond). In other embodiments, sub-stream 504 may be of shorter or longer duration than a symbol time.

In the example of FIG. 5, sub-stream 504 consists of 256 overhead bits (e.g., line encoding bits) and 1024 Ethernet data bits. Example process 500 includes removing the 256 overhead bits of sub-stream 504 and adding packet framing bits (32 bits), outer FEC bits (96), and inner FEC bits (48 bits) to the 1024 Ethernet data bits to generate an intermediate sub-stream 506. Subsequently, process 500 includes dividing the sub-stream 506 into a plurality of sub-bands to generate sub-stream 508 of EPOC data stream 510. Each sub-band includes one or more bits of sub-stream 506 as shown in FIG. 5. As illustrated in FIG. 5, example process 500 eliminates 80 bits of overhead from a symbol of EPON data stream 502 in generating a corresponding symbol of EPOC data stream 510. As a result, example process 500 results in an EPOC data sub-stream of shorter length than the incoming EPON data sub-stream, thereby allowing for lower capacity requirements over the EPOC span of the network.

Figure 6:
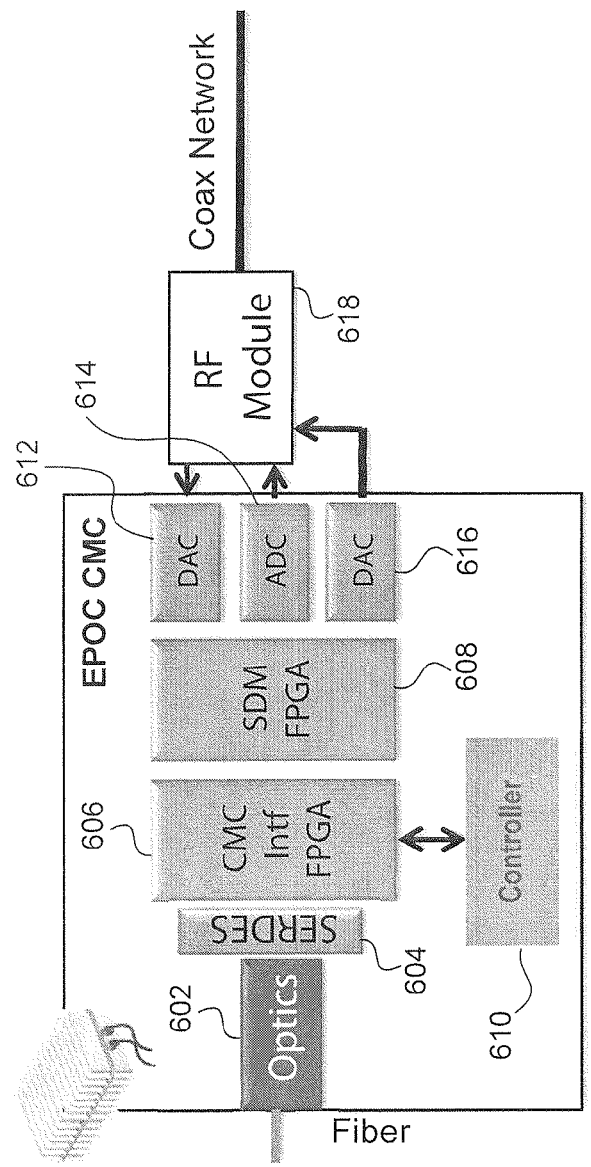
FIG. 6 illustrates an example implementation of an EPOC coaxial media converter (CMC) according to an embodiment of the present invention.

FIG. 6 illustrates an example implementation of an EPOC coaxial media converter (CMC) 600 according to an embodiment of the present invention. Example CMC 600 can be integrated within a network node as described above with reference to FIG. 1, or placed in the basement of a multi-tenant building, for example, as described above with reference to FIG. 2.

As shown in FIG. 6, example CMC 600 includes an optics module 602, a serializer-deserializer (SERDES) module 604, a CMC Interface FPGA (Field Programmable Gated Array) 606, a SDM FPGA 608, a controller module 610, an analog-to-digital converter (ADC) 614, and digital-to-analog converters (DACs) 612 and 616.

A RF module 618 is coupled to CMC 600 to enable CMC 600 to transmit/receive RF signals over a coaxial cable. RF module 618 may include an RF transceiver. In other embodiments, RF module 618 may be integrated within CMC 600.

Optics module 602 may include a digital optical receiver to receive an optical signal over a fiber optic cable coupled to CMC 600 and produce an electrical data signal, and a digital optical laser to transmit an optical signal over the fiber optic cable.

SERDES module 604 performs parallel-to-serial and serial-to-parallel conversion of data between optics module 602 and CMC Interface FPGA 606. In other words, electrical data received from optics module 602 is converted from serial to parallel for further processing. Likewise, electrical data from CMC Interface FPGA 606 is converted from parallel to serial for transmission by optics module 602.

CMC Interface FPGA 606 implements the same functions performed by sublayers 406, 408, and 410 described above with reference to FIG. 4. For example, CMC Interface module 618 may perform line encoding functions, Forward Error Correction (FEC) functions, and framing functions. CMC Interface FPGA 606 optionally with other modules of CMC 600 form a two-way PHY conversion module, as described above with reference to FIG. 4.

SDM FPGA 608 implements the same functions performed by sublayer 412 described above with reference to FIG. 4. For example, SDM FPGA 608 may perform Sub-Band Division Multiplexing functions, including determining the sub-bands to transmit an outgoing bitstream, dividing the outgoing bitstream into multiple sub-bands, determining the width of the sub-bands, and assembling a bitstream received over multiple sub-bands to generate an incoming bitstream. According to embodiments, SDM FPGA 608 may implement any one of Sub-Band Division Multiplexing (SDM), wavelet Orthogonal Frequency Division Multiplexing (OFDM), and Discrete Wavelet Multitone (DWMT), for example.

Controller module 610 provides software configuration, management, and control of CMC Interface FPGA 606 and SDM FPGA 608. Controller module 610 registers CMC 600 with the OLT servicing CMC 600. In an embodiment, controller module 610 is an ONU chip.

DAC 612 and ADC 614 sit in the data path between SDM FPGA 608 and RF module 618, and provide digital-to-analog and analog-to-digital data conversion respectively between SDM FPGA 608 and RF module 618. DAC 616 is used to provide control and configuration signals to RF module 618. For example, in an embodiment, RF module 608 is used to PAM (Pulse Amplitude Modulation) encode the plurality of sub-bands formed by SDM FPGA 608. Thus, DAC 616 can be used to configure RF module 618 according to the PAM encoding to be used.

Figure 7:
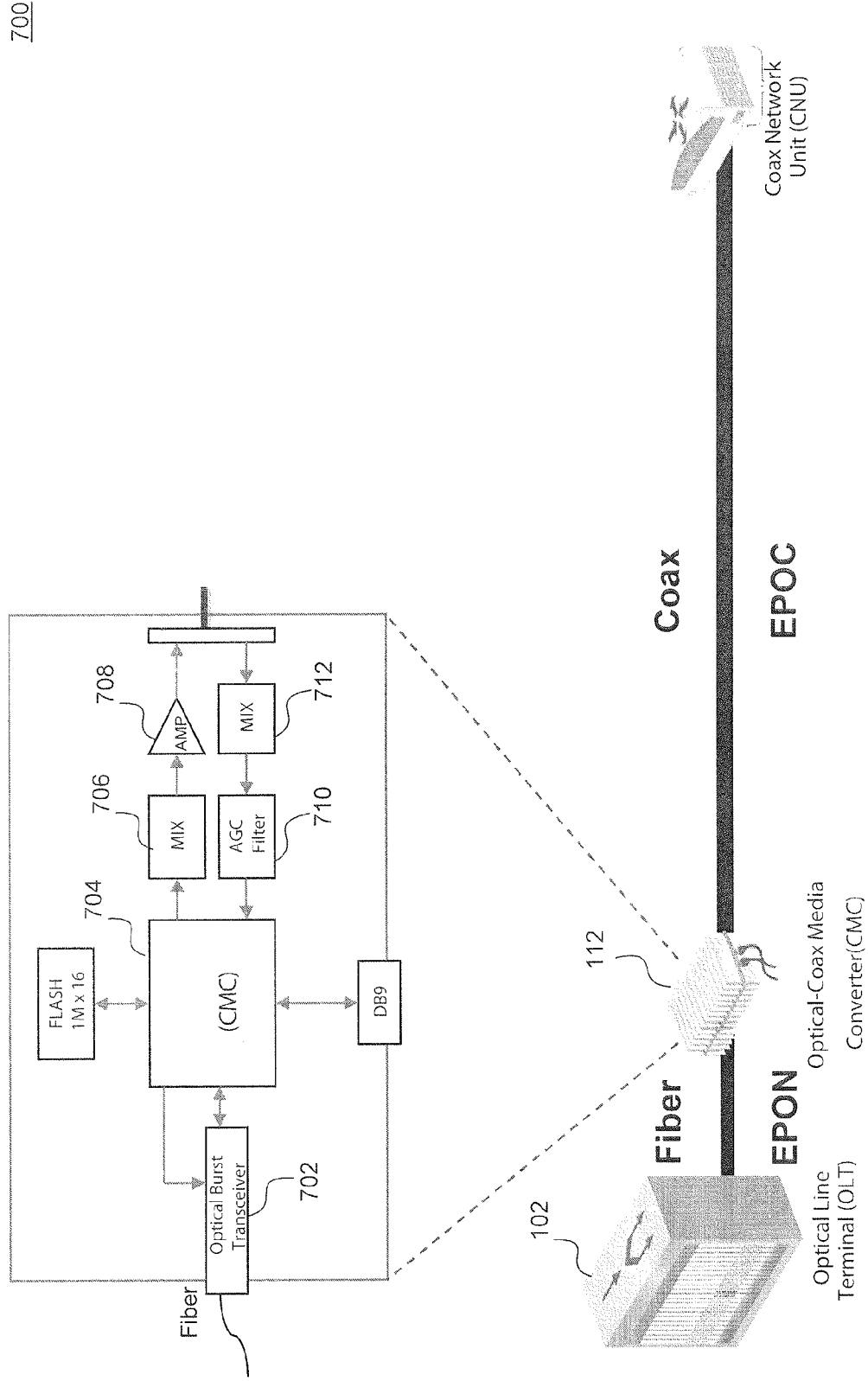
FIG. 7 illustrates another example implementation of an EPOC CMC according to an embodiment of the present invention.

FIG. 7 illustrates another example implementation 700 of an EPOC CMC according to an embodiment of the present invention. As shown in FIG. 7, example implementation 700 includes an optical burst transceiver 702, a PHY conversion module ASIC (Application-Specific Integrated Circuit) 704, and a RF module, formed by mixers 706 and 712, amplifier 708, and AGC (Automatic Gain Control) filter 710. ASIC 704 integrates components such as SERDES 604, CMC Interface FPGA 606, SDM FPGA 608, controller module 610, DAC 612, ADC 614, and DAC 616 within the same integrated circuit.

Figure 8:
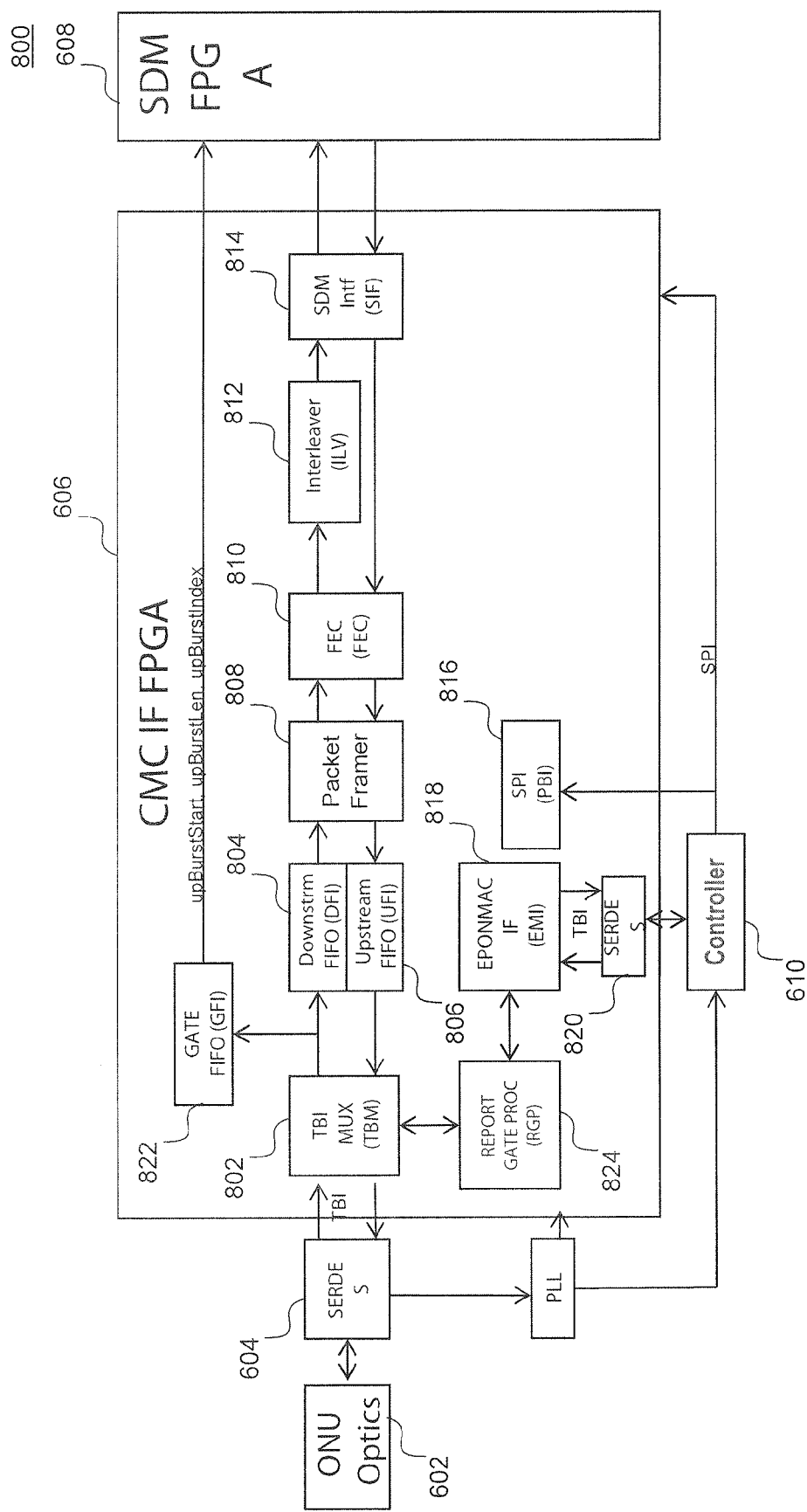
FIG. 8 illustrates an example implementation of a CMC Interface Field Programmable Gate Array (FPGA) according to an embodiment of the present invention.

FIG. 8 illustrates another example implementation 800 of an EPOC CMC according to an embodiment of the present invention. In particular, FIG. 8 shows an example internal architecture of CMC Interface FPGA 606, described above with reference to FIG. 6.

As shown in FIG. 8, CMC Interface FPGA 606 includes a data path having a TBI (Ten Bit Interface) Multiplexer (TBM) 802, downstream and upstream FIFO (first in first out) buffers 804 and 806, a packet framer 808, a FEC module 810, an interleaver 812, and a SDM Interface 814. Additionally, CMC Interface FPGA includes a serial peripheral interface (SPI) 816, an EPON MAC Interface (EMI) 818, a SERDES 820, a GATE FIFO (GFI) 822, and a Report Gate Processor (RGP) 824.

CMC Interface FPGA 606 interfaces with controller module 610 via an SPI bus using SPI 816, and with optics module 602 through SERDES 604 and a TBI bus. TBM 802 acts a virtual splitter on the downstream and as multiplexer on the upstream to allow both data incoming from SDM FPGA 608 and control information from controller module 610 to share the optic uplink.

Figure 9:
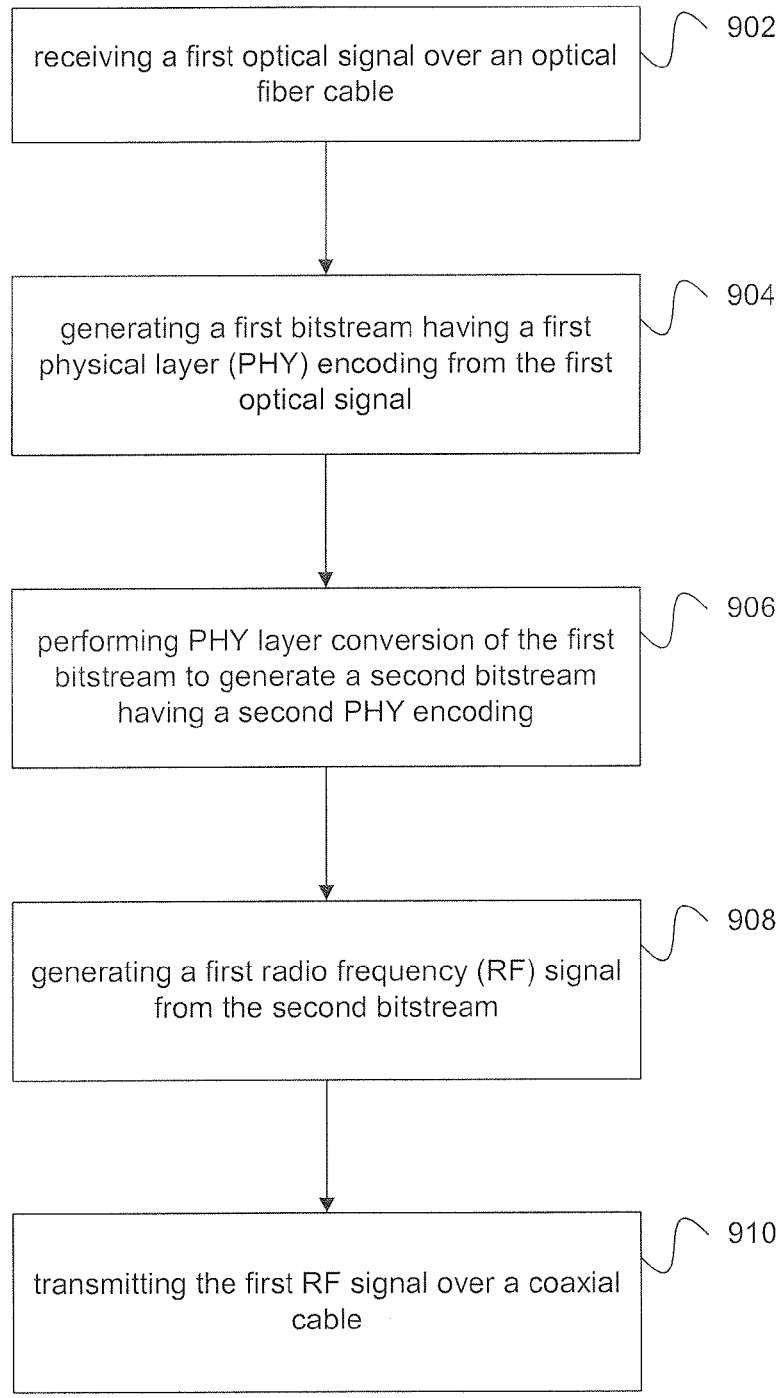
FIG. 9 illustrates an example process for media conversion according to an embodiment of the present invention.

FIG. 9 illustrates an example process 900 for media conversion according to an embodiment of the present invention. Example process 900 begins in step 902, which includes receiving a first optical signal over an optical fiber cable. In an embodiment, the first optical signal is received by a first optical interface of a media converter.

Step 904 includes generating a first bitstream having a first physical layer (PHY) encoding from the first optical signal. In an embodiment, the first PHY encoding is EPON PHY encoding, and the first bitstream consists of raw bits.

Step 906 includes performing PHY layer conversion of the first bitstream to generate a second bitstream having a second PHY encoding. The first and second bitstream have same MAC layer (e.g., EPON MAC, IEEE 802.3ah MAC), but different PHY layer. In an embodiment, the second PHY encoding is EPOC PHY encoding. In another embodiment, the second bitstream is shorter than the first bitstream.

Step 906 may additionally include replacing a first line encoding of the first bitstream with a second line encoding; adding inner and outer forward error correction (FEC) bits; and adding framing bits to generate the second bitstream. Further, step 906 may include dividing the second bitstream into a plurality of sub-bands. In an embodiment, dividing the second bitstream includes performing one of Sub-band Division Multiplexing (SDM), wavelet Orthogonal Frequency Division Multiplexing (OFDM), and Discrete Wavelet Multitone (DWMT).

Step 908 includes generating a first radio frequency (RF) signal from the second bitstream. In an embodiment, generating the first RF signal from the second bitstream includes Pulse Amplitude Modulation (PAM) encoding the plurality of sub-bands. Finally, step 910 includes transmitting the first RF signal over a coaxial cable.

Example process 900 may further include receiving a second RF signal over the coaxial cable; generating a third bitstream having the second PHY encoding from the second RF signal; performing PHY layer conversion of the third bitstream to generate a fourth bitstream having the first PHY encoding; generating a second optical signal from the fourth bitstream; and transmitting the second optical signal over the optical fiber cable.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present invention should not be limited by any of the above-described exemplary embodiments, but should be defined only in accordance with the following claims and their equivalents.

What is claimed is:

1. A media converter, comprising:
    a first interface configured to receive a first optical signal sent from an optical line terminal (OLT) and generate a first bitstream having a first physical layer (PHY) encoding;
    a PHY conversion module, coupled to the first interface, configured to perform PHY layer conversion of the first bitstream to generate a second bitstream having a second PHY encoding; and
    a second interface, coupled to the PHY conversion module, configured to generate a first radio frequency (RF) signal from the second bitstream and to transmit the first RF signal to a coaxial network unit (CNU).

2. The media converter of claim 1, wherein the second interface is further configured to receive a second RF signal from the CNU and generate a third bitstream therefrom having the second PHY encoding, wherein the PHY conversion module is further configured to perform PHY layer conversion of the third bitstream to generate a fourth bitstream therefrom having the first PHY encoding, and wherein the first interface is further configured to generate a second optical signal from the fourth bitstream and to transmit the second optical signal to the OLT.

3. The media converter of claim 2, wherein the first interface includes a digital optical receiver to receive the first optical signal from the OLT, and a digital optical laser to transmit the second optical signal to the OLT.

4. The media converter of claim 1, wherein the first interface includes an optical burst transceiver.

5. The media converter of claim 1, wherein the second interface includes an RF transceiver.

6. The media converter of claim 1, wherein the first PHY encoding is Ethernet Passive Optical Network (EPON) PHY encoding, and wherein the second PHY encoding is Ethernet Passive Optical Network Over Coax (EPOC) PHY encoding.

7. The media converter of claim 1, wherein data packets contained in the first bitstream and in the second bitstream have a same Media Access Control (MAC) layer.

8. The media converter of claim 7, wherein the MAC layer is of an Ethernet Passive Optical Network (EPON) MAC layer.

9. The media converter of claim 7, wherein the MAC layer is that of an IEEE 802.3ah MAC layer.

10. The media converter of claim 1, wherein the OLT and the CNU both are configured to operate an Ethernet Passive Optical Network (EPON) MAC layer.

11. The media converter of claim 1, wherein the media converter enables end-to-end provisioning, management, and Quality of Service (QoS) functions between the OLT and the CNU.

12. The media converter of claim 1, wherein the media converter is coupled to the OLT by only a fiber optic hue.

13. The media converter of claim 1, wherein the media converter is integrated within an optical network unit (ONU) located between the OLT and the CNU.

14. The media converter of claim 1, wherein the media converter is integrated within a network node or amplifier located between the OLT and the CNU.

15. The media converter of claim 1, wherein the PHY conversion module comprises:
    a first module configured to replace a first line encoding of the first bitstream with a second line encoding, and to add inner and outer forward error correction (FEC) bits and framing bits to generate the second bitstream; and
    a second module that divides the second bitstream into a plurality of sub-bands.

16. The media converter of claim 15, wherein the second module performs one of Sub-band Division Multiplexing (SDM), wavelet Orthogonal Frequency Division Multiplexing (OFDM), and Discrete Wavelet Multitone (DWMT).

17. The media converter of claim 15, wherein the second interface is configured to Pulse Amplitude Modulation (PAM) encode the plurality of sub-bands to generate the first RF signal.

18. The media converter of claim 15, wherein the PHY conversion module further comprises:
    a controller chip, coupled to the first interface, configured to provide software configuration, management, and control of the first module and second module.

19. The media converter of claim 15, wherein the second bitstream is shorter than the first bitstream.

20. The media converter of claim 19, wherein the controller chip registers the media converter with the OLT.

21. A method, comprising:
    receiving a first optical signal;
    generating a first bitstream having a first physical layer (PHY) encoding from the first optical signal;
    performing PHY layer conversion of the first bitstream to generate a second bitstream having a second PHY encoding;
    generating a first radio frequency (RF) signal from the second bitstream; and
    transmitting the first RF signal.

22. The method of claim 21, further comprising:
    receiving a second RF signal;
    generating a third bitstream having the second PHY encoding from the second RF signal;
    performing PHY layer conversion of the third bitstream to generate a fourth bitstream having the first PHY encoding;
    generating a second optical signal from the fourth bitstream; and
    transmitting the second optical signal.

23. The method of claim 21, wherein the first PHY encoding is Ethernet Passive Optical Network (EPON) PHY encoding, and wherein the second PHY encoding is Ethernet Passive Optical Network Over Coax (EPOC) PHY encoding.

24. The method of claim 21, wherein data packets contained in the first bitstream and in the second bitstream have same Media Access Control (MAC) layer.

25. The method of claim 24, wherein the MAC layer is of an Ethernet Passive Optical Network (EPON) MAC layer.

26. The method of claim 24, wherein the MAC layer is that of an IEEE 802.3ah MAC layer.

27. The method of claim 21, wherein performing PHY layer conversion comprises:
 replacing a first line encoding of the first bitstream with a second line encoding;
 adding inner and outer forward error correction (FEC) bits; and
 adding framing bits to generate the second bitstream.

28. The method of claim 27, wherein performing PHY layer conversion further comprises:
 dividing the second bitstream into a plurality of sub-bands.

29. The method of claim 28, wherein dividing the second bitstream into the plurality of sub-bands includes performing one of Sub-band Division Multiplexing (SDM), wavelet Orthogonal Frequency Division Multiplexing (OFDM), and Discrete Wavelet Multitone (DWMT).

30. The method of claim 28, wherein generating the first RF signal from the second bitstream comprises Pulse Amplitude Modulation (PAM) encoding the plurality of sub-bands.

31. The method of claim 21, wherein the second bitstream is shorter than the first bitstream.

* * * * *